United States Patent [19]
Wubbe

[11] 3,827,101
[45] Aug. 6, 1974

[54] ARM MOUNTED WINDSHIELD WASHER JET

[75] Inventor: Leo J. Wubbe, Beverly Shores, Ind.

[73] Assignee: The Anderson Company, Gary, Ind.

[22] Filed: Mar. 8, 1973

[21] Appl. No.: 339,394

[52] U.S. Cl. ............................ 15/250.04, 239/284
[51] Int. Cl. ........................... B60s 1/46, B60s 1/52
[58] Field of Search........ 15/250.01, 250.02, 250.03, 15/250.04, ; 239/284, 561, 498, 499, 567

[56] References Cited
UNITED STATES PATENTS

| | | | |
|---|---|---|---|
| 3,149,361 | 9/1964 | Ziegler | 15/250.04 X |
| 3,428,992 | 2/1969 | Giorgio | 15/250.04 |
| 3,432,876 | 3/1969 | Edwards | 15/250.04 |
| 3,440,678 | 4/1969 | Tibbet | 15/250.04 |
| 3,793,666 | 2/1974 | Wurth | 15/250.04 |

FOREIGN PATENTS OR APPLICATIONS

| | | | |
|---|---|---|---|
| 1,294,338 | 4/1962 | France | 15/250.04 |
| 1,295,138 | 4/1962 | France | 15/250.04 |

Primary Examiner—Peter Feldman
Attorney, Agent, or Firm—Hofgren, Wegner, Allen, Stellman & McCord

[57] ABSTRACT

A windshield washer jet mountable to the arm of a windshield wiper assembly has a distribution chamber connectable with a fluid reservoir by means of a hose running along the length of the arm and pairs of jet outlet passageways extending outwardly from the distribution chamber for directing a stream of fluid from the distribution chamber onto the windshield on either side of the wiper blade and toward both ends thereof respectively. The distribution chamber and passageways are formed when the openings of a distribution cavity and jet outlet grooves in the bottom surface of a molded plastic washer body are closed by a cover plate. A rivet or the like extending through the cover, the center of the distribution cavity and a rivet hole in the top of the arm secures the cover to the bottom of the washer body to form the distribution chamber and jet outlet passageways and secures the washer jet body to the arm.

12 Claims, 5 Drawing Figures

PATENTED AUG 6 1974 3,827,101
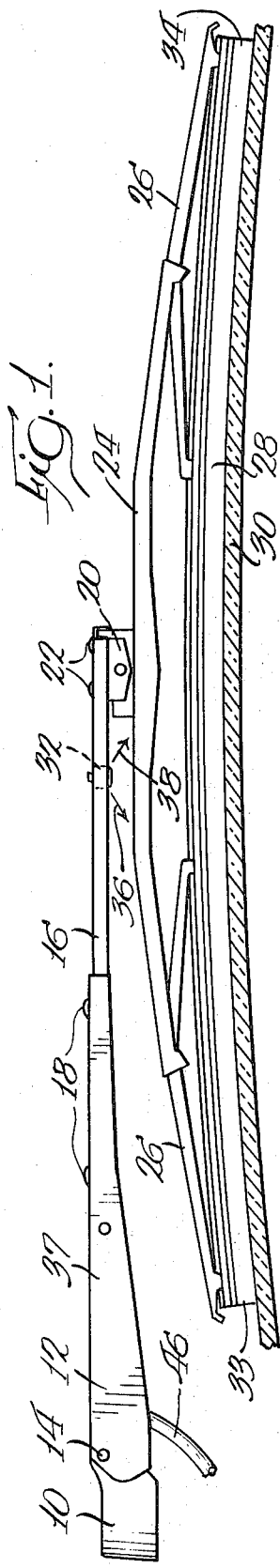
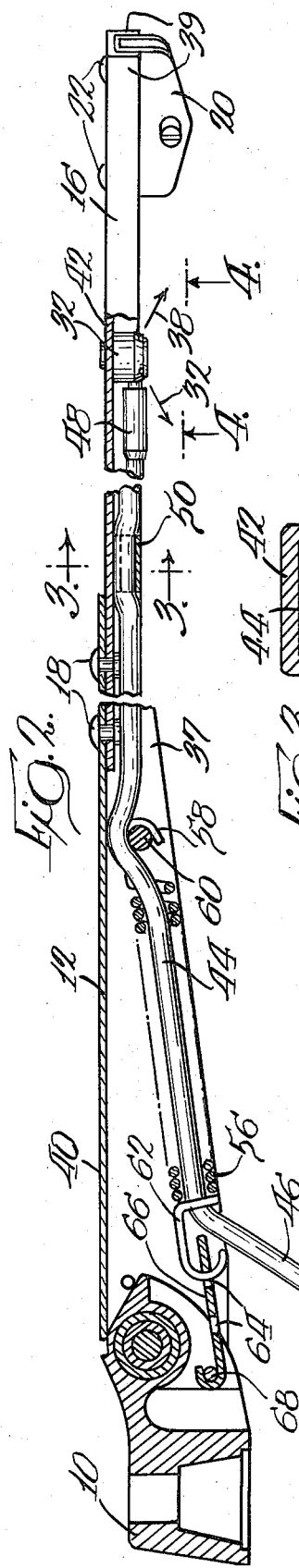
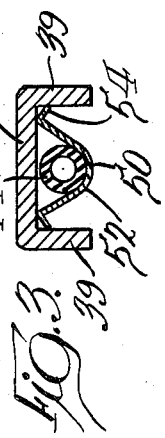
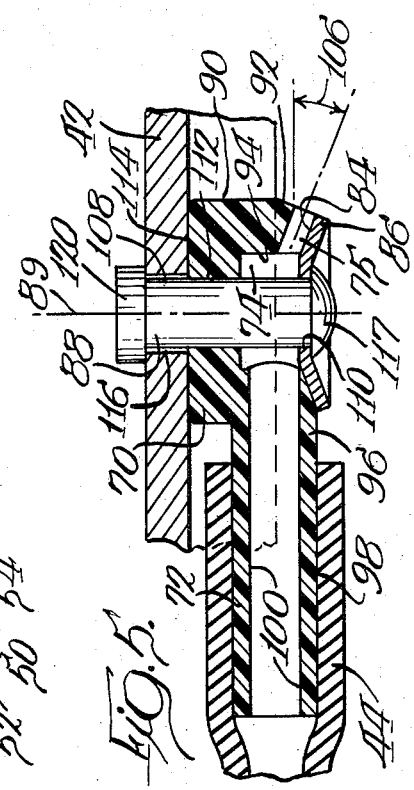
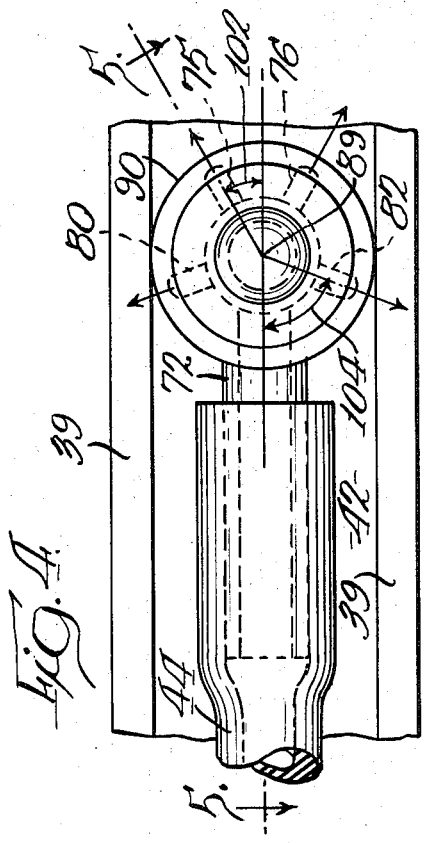

ARM MOUNTED WINDSHIELD WASHER JET

BACKGROUND OF THE INVENTION

This invention relates generally to windshield washers and particularly to an arm mounted windshield washer jet.

Windshield washers used in automobiles and the like have generally comprised a reservoir of fluid located under the hood of the automobile and connected with a compression pump activated by foot pedal or other actuator within the automobile and connected by means of a hose with a washer jet which is directed at the windshield and is typically mounted to the hood or other fixed location adjacent the windshield. When the pump is actuated, fluid from the reservoir is pumped to the washer jet where it is forced out of the jet outlets onto the windshield where it is spread across the windshield by the wiper blades to aid in the removal of dirt, salt, etc. from the windshield.

A problem often encountered with such hood-mounted washer jets is that the cleaning fluid will be delivered to the windshield at a location above the wiper blade when it is already partially through its upward cycle or at a point below the wiper blade when it is partially through its downward path, such that the cleaning fluid is spread by the wiper blade over only a portion of the windshield, thus resulting in only partial cleaning thereof. This problem generally requires the operator to repetitively supply fluid in order to clean the entire windshield, which wastefully depletes the fluid in the reservoir.

A similar problem encountered with hood-mounted washer jets is that delivery of the fluid onto the windshield may be to an area behind the path of windshield wiper travel which may obstruct clear vision through the windshield until another half-cycle of the wiper action is completed, and then only a portion of the windshield may be cleaned.

A further disadvantage of windshield washer jets of the hood-mounted type is that because the jet outlets are located relatively far from the windshield, if they are not aimed properly or later become misaligned, due to damage to the hood, for instance, the stream of fluid may strike the windshield in an ineffective location or miss the windshield entirely if, in addition, a too strong or too weak pumping action is used. Further, because the washer jets are spaced a relatively long distance from the windshield, a strong pumping force or small washer jet outlets, which may easily become clogged, may be required.

Arm-mounted washer jets are known, but due to excessive cost of production, difficulty of mounting, or lack of proper fluid distribution, they have failed to become popular, and thus the driving public has been deprived of the advantages that an arm-mounted washer jet could potentially provide until the present invention.

SUMMARY OF THE INVENTION

The aforementioned problems of prior windshield washers is solved in a novel manner in the present invention by providing an arm-mounted windshield washer jet which is easy to mount, cheap to manufacture and which provides a proper amount of cleaning fluid at the proper location on the windshield for effective cleaning thereof.

The primary object of the invention is to provide an improved arm-mounted windshield washer jet which is more effective and cheaper to produce and easier to mount and which provides more maintenance-free operation than prior windshield washer jets.

A further object of the invention is the provision of an arm-mounted windshield washer jet having two pairs of jet outlets, one pair delivering fluid to the windshield in a direction toward the heel of the wiper blade on both sides of the blade and the other pair delivering fluid to the windshield in a direction toward the tip of the blade on both sides thereof.

Another object of the invention is to provide jet openings in an arm-mounted washer jet of such a size that they are not easily clogged by foreign matter.

Still a further object of the invention is the provision of a windshield washer jet in which the fluid distribution chamber and jet passageways may be formed partially from molded plastic.

Yet another object of the invention is the provision of a windshield washer jet in which the walls of the distribution chamber and jet outlet passageways are defined in part by a body portion having a distribution cavity and jet outlet grooves in one surface thereof and the remaining walls thereof are defined by a cover plate which covers the opening of said cavity and grooves.

Also an object of the invention is the provision of such a windshield washer jet as set forth in the preceding paragraph in which the cover is secured to the body portion and the body portion secured to the windshield washer arms by means of a rivet or the like which extends through the cover, the center of the distribution chamber and through one side of the wiper arm.

Yet a further object of the present invention is the provision of a windshield washer jet assembly which is substantially hidden within the channel of a channel shaped wiper.

Still a further object of the invention is the provision of improved means for restraining the hose connecting the reservoir and the washer jet within the channel of the windshield washer arm along the length thereof.

Other objects, features and advantages of the invention will be made apparent in the following detailed description, taken together with the drawings, where like parts are identified by the same reference numerals, in which:

BRIEF DESCRIPTION OF THE DRAWINGS

FIG. 1 is a side elevation of a typical windshield wiper assembly in which a preferred embodiment of the windshield washer jet of the present invention is mounted;

FIG. 2 is an enlarged side view of a partial section taken through the washer arm of the arm assembly of FIG. 1, illustrating one hose-retaining means and the location and distribution pattern of the windshield washer jet;

FIG. 3 is an enlarged view of a cross section taken substantially along section line 3—3 of FIG. 2, illustrating a hose-retaining spring clip;

FIG. 4 is an enlarged bottom view of a portion of the wiper arm between lines 4—4 of FIG. 2, illustrating the direction of the jet outlets of the windshield washer jet; and, FIG. 5 is a view of a cross section taken substantially along section line 5—5 of FIG. 4, showing the rivet mounting means and cover plate of the windshield washer jet.

DESCRIPTION OF THE PREFERRED EMBODIMENT

Referring to FIG. 1, a typical windshield wiper arm assembly is seen to generally comprise, among other elements, an inner drive shaft receiving section 10, an intermediate channel section 12 pivotally connected to the inner drive shaft receiving section 10 by means of a cross pin or a rivet 14; a channel shaped extension bar section 16 riveted to inner channel section 12 by means of rivets 18; a connector 20 carried by the free end of the bar section 16 and secured thereto by means of rivets 22 for pivotally supporting a windshield wiper blade assembly. The wiper blade assembly comprising a superstructure having a primary yoke member 24 with two secondary yoke members 26 pivotally mounted at either end thereof to which is secured a resilient wiper blade 28 in wiping contact with windshield 30. In accordance with the invention, a windshield washer jet 32 is secured in the channel shaped extension bar section 16 adjacent connector 20 and is designed and mounted to deliver fluid to windshield 30 on either side of blade 28 toward the heel end 33 and the tip end 34 thereof, respectively, as indicated by direction arrows 36 and 38. It should be appreciated that although the washer jet of the invention is adapted for use with a windshield wiper assembly of the type shown in FIG. 1, the wiper arm assembly of FIG. 1 is shown only for illustrative purposes, and the washer jet is capable of embodiment for use on other types of wiper arm assemblies.

As best illustrated in FIGS. 2 and 3, both intermediate channel section 12 and extension bar section 16 are channel shaped having spaced-apart parallel side walls 37 and 39, respectively, which merge with common top walls 40 and 42, respectively. Washer jet 32 is mounted substantially obscured within the channel of extension bar section 16 with the jet outlets located only slightly without the channel beyond the open face thereof.

Also in the channels of intermediate channel section 12 and extension bar section 16 is a hose 44 connected at one end 46 with a fluid reservoir (not shown) and connected at the other end 48 with the washer jet 32. As best shown in FIG. 3, hose 44 is retained within the channel of the extension bar section 16 in part by means of one or more retainer clips 50 which extends around the surface of hose 44 adjacent the open face of the channel supporting it against top wall 42. The retainer clip 50 is formed from a suitable flexible resilient material and has a generally U-shaped portion 52 with lip portions 54 at both ends thereof extending at right angles from U-shaped portion 52 toward the inner surfaces of side walls 39. In the unflexed condition, the distance between the ends of leg portions 54 is greater than the distance between side walls 39 and thus, when retainer 50 is inserted in its retaining position, as shown in FIG. 3, the ends of legs 54 resiliently bear against and bite into the inner surfaces of side walls 39 and each end wedges between one side wall 39 and the top wall 42. The friction forces between the ends of legs 54 and side walls 39 maintain retainer 50 and thus hose 44 within the channel.

Hose 44 is retained within the channel of intermediate section 12 by means of a helical tension spring 56 which, in addition to serving the function of retaining hose 44 within the channel, functions to rotate the intermediate channel section 12 and extension bar section 16 about cross pin pivot 14 to urge the wiper blade 28 toward windshield 30 to maintain it in firm wiping contact therewith. Helical tension spring 56 has a hook 58 at one end hooked around a cross pin 60 extending between side walls 37 and a hook portion 62 hooked through either one of two openings 64 in a spring clip 66 which, in turn, is hooked around a post 68 of inner drive shaft receiving section 10. Hose 44 is routed between top wall 40 and post 60 and extends through the center of the helical tension spring 56 between its coils and is thereby retained within the chamber of intermediate channel section 12.

Referring to FIGS. 4 and 5, the windshield washer jet is seen to comprise a body 70 having an inlet sleeve 72 for connecting hose 44 with a distribution cavity 74 and two pair of jet outlets 75, 76 and 80, 82 formed in a bottom surface 84 of body 70, a cover plate 86 for closing the open faces of the cavity and the jet outlet grooves and a rivet 88 for securing the cover plate 86 to body 77 and, in turn, securing body 70 to top wall 42 of extension bar section 16.

The portion of body 70 which contains distribution cavity 74 and the jet outlet grooves has a substantially circular cross section with a cylindrical outer wall surface 90 and a conical outer wall surface 92 forming a continuation of wall surface 90 which extends downwardly therefrom to bottom surface 84 inwardly toward the center axis 89 of the circular cross sectional portion of body 70. Bottom surface 84 also comprises a portion of a conical surface and extends at substantially a right angle from outer wall surface 92 in a direction upward toward a top surface 91 of washer body 70 and toward center axis 89, where it meets cylindrical side wall 94 of distribution cavity 74.

Inlet sleeve portion 72 comprises an elongate cylindrical wall 96 which extends radially outward from center axis 89. Wall 96 has an outer surface 98 which at the top of wall 96 joins with outer cylindrical wall surface 90 at a right angle thereto and which at the bottom of wall 96 joins with conical wall surface 92 where it meets bottom surface 84. An inner surface 100 of wall 96 extends inwardly beyond wall surface 90 and opens into distribution cavity 74.

Resilient flexible hose 44 is telescoped over the open end of sleeve 72 to establish fluid communication between the distribution chamber 74 and the fluid reservoir (not shown) connected to the other end of the hose. The outer diameter of sleeve 72 is slightly larger than the inside diameter of the hose in its unstretched state so that a resilient waterproof seal between the outside surface of hose 44 and outside surface 98 of sleeve wall 96 is formed. The inside diameter of sleeve 72 is substantially equal to the inside diameter of hose 44 so that it is substantially colinear with the unstretched portion thereof to minimize turbulence at the junction of the open end of the sleeve and the hose.

As best seen in FIG. 4, the radial direction in which sleeve 72 extends from cavity 74 bisects the angles between jet outlet grooves 82 and 80 and between jet outlet grooves 75 and 76, such that fluid is delivered to the distribution chamber at a point equidistant from the cavity openings of each pair of jet outlet grooves. Since washer jet 32 is located closer to heel 33 than tip 34 of wiper blade 28, jet outlet pair 75 and 76 are directed at a lesser angle relative to the elongate axis of sleeve 72 than are jet outlet grooves 80 and 82 so that the fluid from outlet jets 75 and 76 will be given a greater longitudinal projectory along the length of the blade to cover the further required distance. A preferred direction angle 102 for jet outlets 75 and 76 is 30° and a preferred direction angle 104 for jet outlets 80 and 82 is 70°. All jets radiate downward at the same angle 106, preferably 20°, toward the windshield (see FIG. 5).

Turning again to FIG. 5, it is seen that cover plate 86 performs a dual function of both closing the open faces of distribution cavity 74 and the jet outlet grooves to respectively form a distribution chamber and jet outlet passageways, and provides a bearing surface for rivet 88 to secure washer jet 32 to extension bar section 16. A shank portion 108 of rivet 88, of lesser diameter than distribution cavity 74, extends through a rivet opening 110 in cover plate 86, through the center of distribution cavity 74, through a rivet opening 112 extending from the top of cavity 74 through a top surface 114 of body 70 and through a rivet opening 116 in top wall 42 of extension bar 16. A bottom surface of rivet head 117 is of greater diameter than rivet opening 110, bears against the outer surface of cover plate 86, and after the rivet has been inserted through each of the rivet openings, a flange 120 is formed in the usual manner from the portion of shank 108 extending beyond the top of top wall 42 to secure together the cover plate 86, body 70 and extension bar section 16.

During operation of the washer jet 32, fluid from the fluid reservoir is pumped through hose 44 into distribution chamber 74 where it circulates in distribution chamber 74 around shank 108 of rivet 88 and is forced through and out the jet outlets. The fluid from jet outlets 75 and 76 is delivered to windshield 30 toward tip 34 of wiper blade 28 on either side thereof, and fluid from jet outlets 80 and 82 is delivered to windshield 30 toward heel 33 of blade 28 on either side thereof.

I claim:

1. In a windshield washer jet assembly for delivering cleaning fluid to a windshield adapted to be mounted to a windshield wiper arm assembly carrying a windshield wiper blade at one end thereof, an improved arrangement for securing said washer jet assembly to the wiper arm assembly, comprising: washer jet body means top and bottom surfaces having a distribution chamber means with side walls within the body, jet outlet passageway means extending from the distribution chamber to a side wall of the washer jet body means, and inlet passageway means extending from without the side wall of the washer body to the distribution chamber; and securing means extending between the top and bottom surfaces of the washer jet body means through said distribution chamber for securing said washer body to the wiper arm assembly, said securing means being spaced from the side walls of the distribution chamber to permit the flow of cleaning fluid from the inlet passageway means through the space between the securing means and the side walls of the distribution chamber to the jet outlet passageway means for delivery to the windshield.

2. The washer jet assembly securing arrangement of claim 1 in which said washer jet body means includes a washer jet body having a distribution cavity and jet outlet grooves having open faces in one surface thereof, and cover plate means for closing said open faces of the distribution cavity and jet outlet grooves to form said distribution chamber and jet outlet passageways, respectively.

3. The washer jet assembly securing arrangement of claim 2 in which said securing means secures said cover plate means in sealing engagement with said one surface.

4. The washer jet assembly securing arrangement of claim 3 in which said securing means comprises a rivet.

5. The washer jet assembly securing arrangement of claim 1 in which said inlet passage means comprises an elongate sleeve adapted to be telescopically received within the open end of a hose for connection with a source of cleaning fluid.

6. The washer jet assembly securing arrangement of claim 1 in which said wiper arm assembly is channel shaped and includes a helical torsion spring contained within the channel for spring biasing the wiper blade against the windshield, and said washer jet assembly includes a resilient flexible hose having one end connected to a fluid reservoir and the other end connected to said inlet passageway to provide fluid communication between the reservoir and the distribution chamber, said hose extending along the arm within the channel and through the center of the helical spring, said helical spring retaining said hose within the channel.

7. A windshield washer jet assembly adapted to be mounted to the arm of a windshield wiper assembly, comprising: washer jet body means having a first portion with top, side and bottom surfaces, a distribution cavity and jet outlet grooves extending from the cavity to the side surface having open faces in the bottom surface and a second portion providing an inlet passageway extending from without the first portion to within the distribution cavity; cover plate means; and, means for securing the cover plate means to the bottom surface of the first portion for providing a waterproof closure of the open faces of the distribution cavity and jet outlet grooves to respectively form therewith a distribution chamber and jet outlet passageways, respectively.

8. The windshield washer jet assembly of claim 7 in which said securing means comprises a headed shaft means extending through the cover plate and the distribution cavity toward the top surface of the first washer jet body portion.

9. The windshield washer jet assembly of claim 8 in which said headed shaft extends through the top surface of the first washer jet body portion and through the wiper arm to secure the first washer jet body portion to the wiper arm.

10. The windshield washer jet assembly of claim 9 in which said headed shaft comprises a rivet.

11. The windshield washer jet assembly of claim 7 in which two pair of washer jet outlet passageways are formed in said bottom surface, one pair of jet outlet passageways being directed toward one end of the wiper blade and the other pair of jet outlet passageways being oppositely directed toward the other end of the wiper blade, one jet outlet of each pair being directed to deliver fluid to the windshield at one side of the wiper blade and the other jet outlet passageway of each pair being directed to deliver fluid to the windshield on the other side of the wiper blade.

12. The windshield washer jet assembly of claim 11 in which all of the washer jet outlet passageways are directed downward toward the windshield.

* * * * *